United States Patent [19]

Hills

[11] Patent Number: 4,594,017

[45] Date of Patent: Jun. 10, 1986

[54] JOIST HANGER AND BLANK THEREFOR

[75] Inventor: Robert A. Hills, Jacksonville, Fla.

[73] Assignee: Altech Industries, Inc., Jacksonville, Fla.

[21] Appl. No.: 745,532

[22] Filed: Jun. 17, 1985

[51] Int. Cl.$^4$ ............................ B25G 3/00; F16D 1/00
[52] U.S. Cl. ......................................... 403/6; 403/376;
403/232.1; 52/702
[58] Field of Search ...................... 403/232.1, 6, 376;
52/702

[56] References Cited

U.S. PATENT DOCUMENTS

| | | |
|---|---|---|
| 478,163 | 1/1892 | Lehman . |
| 537,504 | 4/1895 | Van Dorn . |
| 537,505 | 4/1895 | Van Dorn . |
| 546,147 | 9/1895 | Gregg . |
| 625,427 | 5/1899 | Stewart et al. . |
| 666,918 | 1/1901 | Butz . |
| 679,349 | 7/1901 | Tuteur . |
| 717,316 | 12/1902 | Avery . |
| 753,053 | 2/1904 | Eberhardt . |
| 770,050 | 9/1904 | Dreyer . |
| 796,433 | 8/1905 | Kahn . |
| 804,451 | 11/1905 | Carlson . |
| 828,488 | 8/1906 | Lanz . |
| 874,514 | 12/1907 | Lindow . |
| 922,215 | 5/1909 | Tuteur . |
| 1,105,851 | 8/1914 | Sherwood . |
| 1,406,723 | 2/1922 | Caldwell . |
| 1,833,692 | 11/1931 | Silvio . |
| 2,911,690 | 11/1959 | Sanford ........................ 20/94 |
| 3,278,149 | 10/1966 | Brucker ...................... 248/239 |
| 3,601,428 | 8/1971 | Gilb ......................... 287/20.94 |
| 3,633,950 | 1/1972 | Gilb ......................... 287/20.94 |
| 3,752,512 | 8/1973 | Gilb ......................... 287/20.94 |
| 3,837,135 | 9/1974 | Zachman ...................... 52/702 |
| 3,972,169 | 8/1976 | Sheppard ..................... 52/702 |
| 4,005,942 | 2/1977 | Gilb .......................... 403/189 |
| 4,192,623 | 3/1980 | Borg ........................ 403/232.1 |
| 4,291,996 | 9/1981 | Gilb ........................... 403/14 |
| 4,411,548 | 10/1983 | Tschan ..................... 403/232.1 |
| 4,480,941 | 11/1984 | Gilb ........................ 403/232.1 |

FOREIGN PATENT DOCUMENTS 830832 7/1949 Fed. Rep. of Germany .
1431122 4/1976 United Kingdom .

Primary Examiner—Andrew V. Kundrat

[57] ABSTRACT

A unitary blank and a hanger for connecting a wooden joist to a header beam, including an elongated strap extending upwardly from a stirrup formed from two sidewalls the lower portion of the strap and a pair of partially overlapped flanges having aligned nail holes projecting inwardly from the sidewalls and forming the stirrup bottom. The sidewalls include elongated finger access openings, and the hanger strap has a keyhole for accurate hanging to permit passage of a pre-driven nail head through the large portion only of the keyhole, and a large bolt or screw hole adjacently below the keyhole.

21 Claims, 9 Drawing Figures

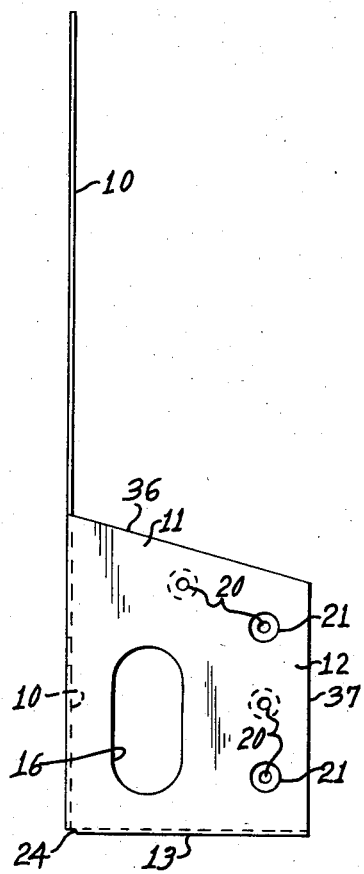
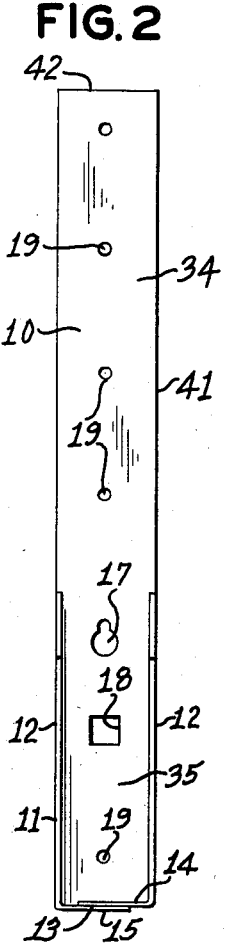
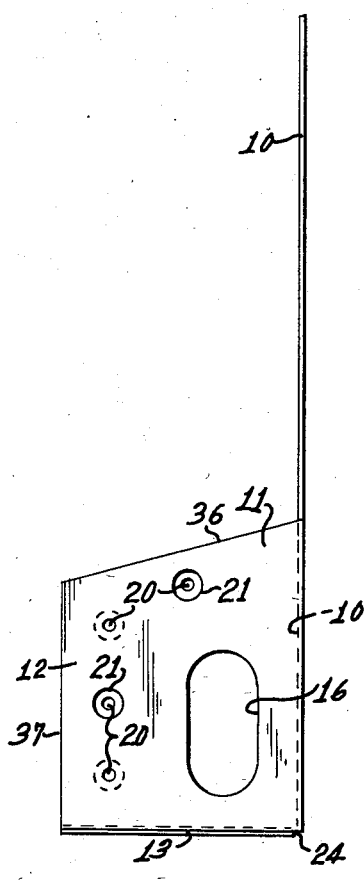
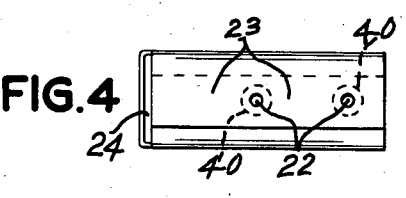
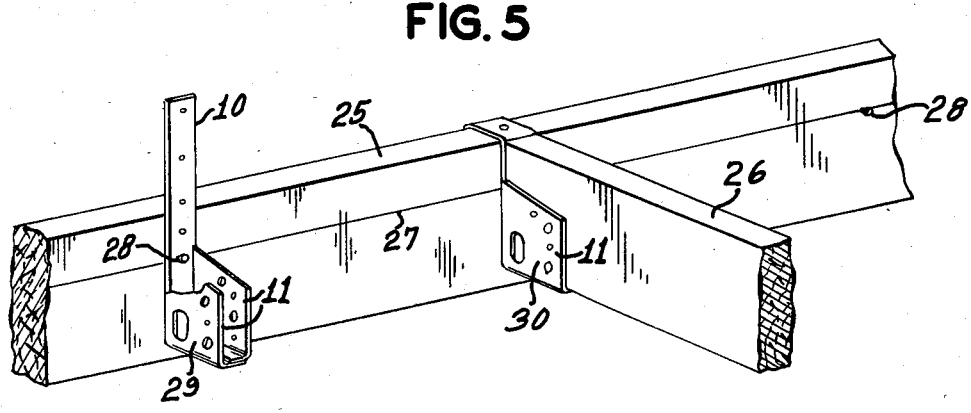

JOIST HANGER AND BLANK THEREFOR

BACKGROUND OF THE INVENTION

Residential houses and many business structures are formed by building a wooden framework which is then covered by any of a wide variety of materials to provide an attractive and durable inside and outside appearance. Vertical beams connecting the floor to a ceiling framework are called "studs" and are used as the framework for walls. Horizontal beams are called "joists" and are used as a framework for the ceiling of a lower room and the floor of an upper room. Joists generally branch off at right angles from a main supporting beam called a "header." In order to provide proper support in connecting a joist to a header in a T-connection, it has become standard practice to employ a joist hanger made of steel which can be nailed to the header and to the joist. This avoids the prior weakness of employing the "toenail" technique of connecting the beams without using a hanger.

There are several designs of joist hangers, e.g., U.S. Pat. Nos.:

| | |
|---------|-----------|
| 537,504 | 874,514 |
| 546,147 | 3,601,428 |
| 625,427 | 3,752,512 |
| 666,918 | 4,005,942 |
| 753,053 | 4,411,548 |
| 770,050 | 4,480,941 |
| 828,488 | |

Many of these are preformed to provide a connection between beams of only a few sizes and are not sufficiently adaptable to be employed for many different combinations of beams. Many have special features which cause the hangers to be overly expensive to manufacture. Many do not have any provision for bolt or large screw connectors. Many are difficult or dangerous to use because of the constricted spaces in which nails must be driven in order to attach the hanger to the header beam. None of the prior art hangers provide an automatic alignment means for any selected combination of beams and joists.

It is an object of this invention to provide an improved joist hanger. It is another object of this invention to provide an improved joist hanger which is inexpensive to manufacture, minimizes waste, is safe and easy to use, and has alignment and bolt-attachment features. Still other improvements will be apparent from the more detailed description which follows.

BRIEF DESCRIPTION OF THE INVENTION

This invention relates to a joist hanger for connecting a wooden joist to a wooden header, said joist hanger comprising:

(a) a stirrup seat member having two parallel sidewalls and a bottom wall extending outwardly at right angles from a hanger strap adapted to lie against the face of said header;

(b) said bottom wall including flanges of each said sidewall bent toward each other and partially overlapped to form a double thickness over a portion of the distance between said sidewalls;

(c) an elongated hanger strap extending from said bottom wall to a substantial distance above the tops of said sidewalls and adapted to be bent to match the outside contour of said header;

(d) a keyhole passageway through said hanger strap adjacent said sidewalls having a large opening adapted to permit passage of a nail head therethrough and a small opening adapted to permit passage of a nail shank but not a nail head therethrough;

(e) a plurality of spaced holes through said sidewalls said bottom wall and said hanger strap to permit passage of a nail shank but not of a nail head therethrough; and (f) an elongated finger access passageway through each said sidewall adjacent said hanger strap adapted to permit fingers to extend therethrough to hold a nail to be driven through said hanger strap into said header.

This invention also relates to a metal joist hanger blank for forming a unitary joist hanger comprising an inverted T-shaped planar member comprising a substantially rectangular base portion having an upper edge, a lower edge and two parallel side edges and an elongated vertical strap portion having two parallel side-edges and a free upper end extending upwardly medially of said upper edge; a generally rectangular cutout portion medially of said lower edge and extending laterally beyond the respective vertical projections of said side edges of said strap portion and having an upper edge parallel to said lower edge of said base portion; a pair of vertical fold lines aligned with said side edges of said strap portion and extending from said upper edge of said base portion to said cutout portion; a pair of horizontal fold lines aligned with the upper edge of said cutout portion and extending from said cutout portion to said respective side edges of said base portion; a plurality of spaced holes punched through said strap portion and said base portion of a size to receive the shank of a nail therethrough but not large enough to permit the passage of a nail head therethrough; and a keyhole passageway between said vertical fold lines and adjacent said upper edge.

In preferred embodiments, the joist hanger includes a passageway through the hanger strap to accommodate a bolt or large screw, and the joist hanger is a single piece of steel bent and joined together by spot welding into the finished product.

BRIEF DESCRIPTION OF THE DRAWINGS

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 1 is a left side elevational view of the joist hanger of this invention.

FIG. 2 is a front elevational view of the joist hanger of this invention.

FIG. 3 is a right side elevational view of the joist hanger of this invention.

FIG. 4 is a bottom plan view of the joist hanger of this invention.

FIG. 5 is a schematic perspective view of the hanger being attached to a header beam and employed as a seat for a joist.

DETAILED DESCRIPTION OF THE INVENTION

Figure 6:
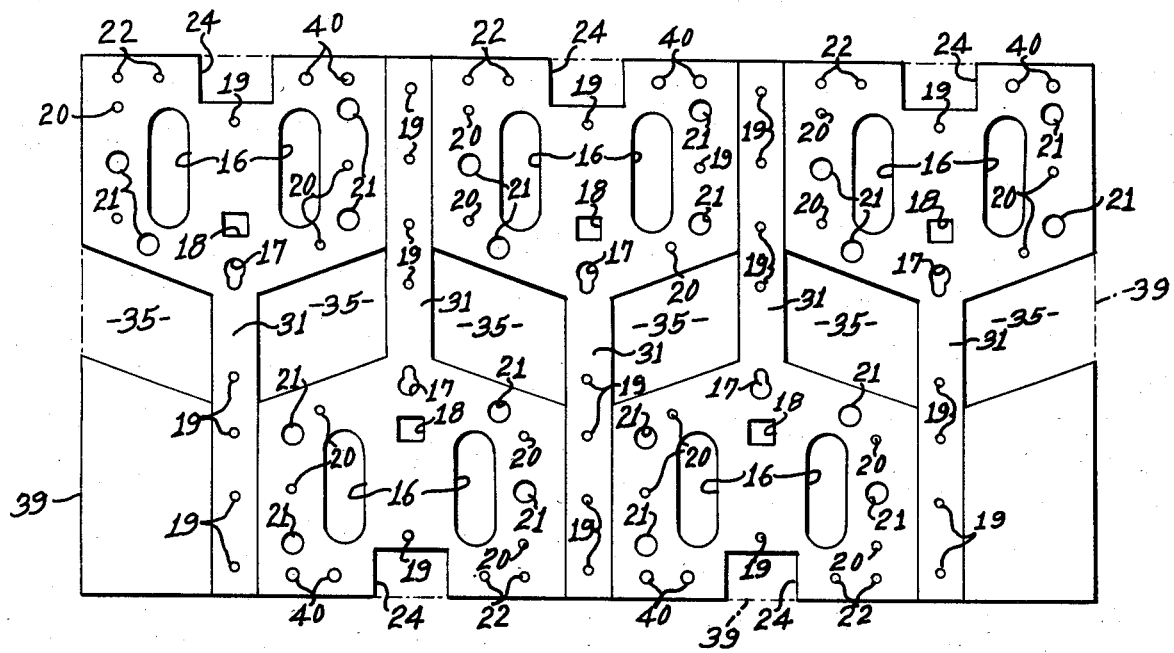
FIG. 6 is a plan view of a portion of a sheet of metal blanked to produce individual pieces to be formed into the joist hanger of this invention.

The joist hanger is seen in all of its detail in FIGS. 1-4 of the drawings. The joist hanger is a single piece of sheet steel folded and spot welded at its bottom overlapping flanges to maintain its folded shape. The hanger includes a hanger strap portion 10 and a unitary stirrup portion 11. Hanger strap portion 10 is designed to be attached to the large header beam and stirrup portion 11 is designed to receive and hold the adjoining joist. Hanger strap portion 10 is an elongated strap comprising a free end portion 34 having two parallel side edges 41 and a free upper end 42, and a connected end portion 35 which forms the back wall of stirrup portion 11. Portions 34 and 35 contain several punched holes 19 for convenience in attaching the strap to the wooden header beam. Holes 19 are designed to permit passage therethrough of the shank of an appropriate size nail but not the nail head. A keyhole 17 is provided through connected end portion 35 adjacent upper edge 36 of sidewalls 12 and having its larger portion sufficient to permit a nail head to pass through and the smaller portion only large enough to permit the shank of that nail to pass through. Hole 18 is of sufficient size to fit the shank of a bolt or large screw. If carriage bolts are to be employed, it is desirable to fashion hole 18 in the shape of a square to fit the square neck portion of a carriage bolt. If a lag screw is to be employed, a round hole is suitable. Preferably hole 18 is square so as to fit either a carriage bolt, lag screw or other bolt and nut combination.

Stirrup portion 11 is a cup-shaped structure comprising as its back wall, the connected end portion 35 of strap 10, two side walls 12 and a bottom wall 13. Sidewalls 12 and bottom wall 13 project outwardly at right angles from strap 10 to form a convenient receptacle for the end of a joist, which may be 2×4, 2×6, 2×8, 4×8, 4×10, etc. Sidewalls have an upper edge 36 and side edges 37. Sidewalls 12 are spaced apart and parallel to each other so as to fit snugly against the sides of the joist, the space between sidewalls 12 being approximately 1¾ inches in the case of a nominal 2-inch joist. Holes are punched through sidewalls 12 so as to be aligned in pairs, with one of each pair in each sidewall 12. Holes 20 and 21 are designed to receive nails for attaching each sidewall 12 to the joist. Hole 20 is small, the same as holes 19 in strap 10. Holes 21 are 3-4 times larger indiameter than holes 20. The nail is driven into the joist from the sidewall having hole 20 so the head of the nail will be retained outside of the sidewall 12 where hole 20 is located. The point of the nail will extend beyond the other side of the joist, through hole 21 and the sidewall 12 containing hole 20. The projecting point of the nail is then bent over the outside of sidewall 12 so as to clamp that nail in place. Hole 21 is made sufficiently large to permit the nail to be driven from the other side at a slight angle through hole 20 and yet project outwardly through hole 21 and be bent to clamp the nail in place. It will be seen that there are two inlet nail holes 20 and two outlet nail holes 21 in each sidewall 12 so as to permit two attachments for each sidewall 12 to the joist.

Large elongated passageway 16 is formed into each sidewall 12 to provide an access for fingers to hold a nail to be driven through the lowest nail hole 19 in connected end portion 35. It will be appreciated that without finger access passageways 16 it would be very difficult to hold a nail to be driven into lower hole 19.

Bottom wall 13 is a double thickness over at least part of the lower side of stirrup portion 11. Flanges 14 which extend downwardly from sidewalls 12 (see FIGS. 7-9) are bent, overlapped, and fastened together, preferably by spot welding, e.g., at one or both of locations 23 to form bottom wall 13. If the common spot welding in the form of a circle of about ¼ inch is employed, it is preferred to use both of locations 23. If a larger area, e.g., a rectangular area of about ½ inch is welded, a single location between holes 22 is sufficient. Holes 22 are the same size as holes 19 to permit passage of the nail shank therethrough but not the nail head. In order to allow for minor variations in the manufacturing process inner flange 14 is made with larger holes 40 and outer flange 14 with smaller holes 22. When flanges 14 are bent and overlapped holes 22 will overlay some part of the holes 40 and always leave a passageway for a nail. An open heel passageway 24 is shown as a preferred embodiment when the joist hanger is made of one piece with overlapping flanges 14.

In FIG. 5 there is shown the use of the joist hanger in assembling wooden framework. A large header beam 24 which may be 2×6, 2×8, 2×10, 4×8, 4×10 or the like is in place as part of the structure, usually a principal supporting beam positioned horizontally. It is desired to attach a plurality of other beams, usually smaller in size, at right angles to the header beam 25 to serve as the basic framework for the ceiling of a room. Such branching beams are usually called joists and one is shown in the drawing as 26. A typical structure has such joists spaced 16 inches apart and parallel to each other. In accordance with a feature of this invention a guideline 27 is drawn on header beam 25 to align the several joist hangers that will be attached to header beam 25 before joist 26 is placed in each hanger. Nails 28 are almost fully driven into beam 26 along line 27 at the appropriate spacing for joists, e.g., 16 inches apart. A joist hanger 29 is then positioned on nail 28 by placing keyhole 17 (see FIG. 2) over the head of nail 28, and sliding hanger 29 downward so that the smaller portion of keyhole 17 fits around the shank of nail 28 and the head of nail 28 is then fully driven in to fit hanger 29 tightly against beam 25. If desired, a carriage bolt or lag screw can then be employed to fasten hanger 29 to beam 25 through square hole 18 (FIG. 2) to provide greater holding strength. Nails can then be driven into holes 19 (see FIG. 2) to fasten joist 29 securely to beam 25. It is preferred to bend hanger strap 10 around the outer contours of beam 25 and to nail it to beam 25 through several or all of nail holes 19. Nails will then be driven through holes in the sidewalls 12 of stirrup portion 11 and then through holes 22 in the bottom wall 13 to attach it securely to joist 26. The finished product will have the joist hanger appearing as at 30.

In FIGS. 6-9 there is shown a joist hanger blank and preferred method of manufacturing the joist hanger from such blank. A flat piece of steel 39, approximately 18 gauge, is subjected to a blanking and punching operation to produce a plurality of blanks 31 with appropriately positioned punched out nail holes 19, 20, and 22, finger access passageways 16, heel passageways 24, keyholes 17, bolt holes 18, and nail outlet holes 21 and 40. By appropriate designing of the blanking operation only areas 16, 24, and 35 are considered to be waste. The final blanked piece 31 has a general inverted T-shape with a substantially rectangular base portion defined by upper edge 36, side edges 37, and lower edge 38, and an elongated vertical strap portion 10 defined by parallel side edges 41 and upper free end 42.

Figure 7:
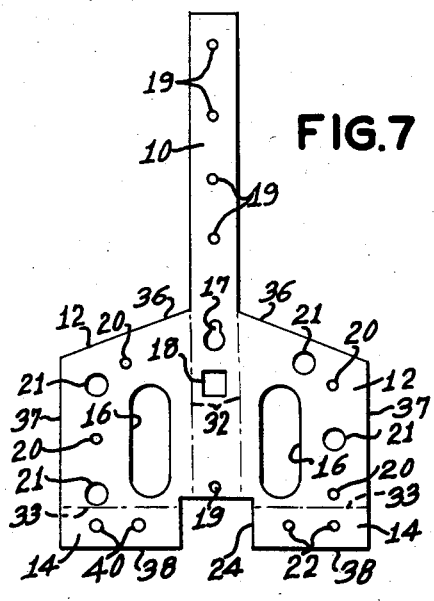
FIG. 7 is a top plan view of an individual piece ready to be formed into the joist hanger of this invention.
Figure 8:
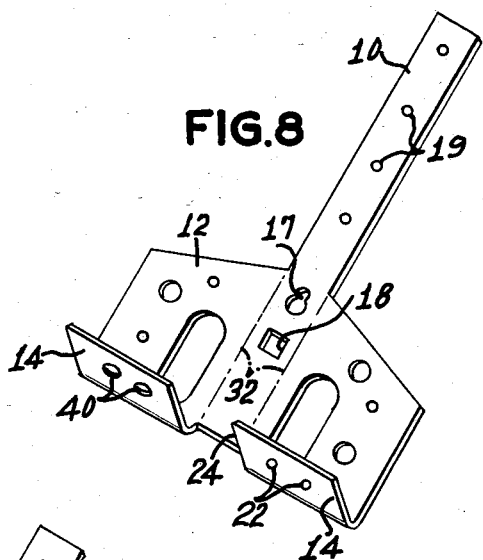
FIG. 8 is the piece of FIG. 7 after bending upwards the sidewall extensions.
Figure 9:
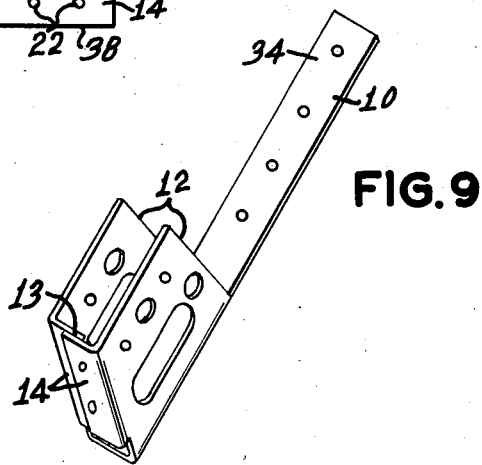
FIG. 9 is the finished joist hanger after bending the sidewalls an bottom wall of the piece of FIG. 8 into final position.

Blanked piece 31 is shown in FIG. 7 where the dotted lines represent vertical fold lines 32 and horizontal fold lines 33. Bottom flanges extending downwardly from sidewalls 12 are wiped or folded upwardly as shown in FIG. 8. Sidewalls 12 are wiped or folded upwardly to produce the final shape as shown in FIG. 9. It will be seen that bottom flanges 14 partially overlap each other in FIG. 9 and one or both of areas 23 are subjected to spot welding to permanently hold sidewalls 12 in their parallel position and to hold the two thicknesses of flanges 14 together to form bottom wall 13 with openings 22 and 40 in alignment. It is to be understood that some of the openings, such as finger access passageways 16, may be punched at the same time as bottom flanges 14 are wiped upwardly, if desired.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. A joist hanger for connecting a wooden joist to a wooden header, said joist hanger comprising:
   (a) a stirrup seat member having two parallel sidewalls and a bottom wall extending outwardly at right angles from a hanger strap adapted to lie against the face of said header;
   (b) said bottom wall including flanges of each said sidewall bent toward each other and partially overlapped to form a double thickness over a portion of the distance between said sidewalls;
   (c) an elongated hanger strap extending from said bottom wall to a substantial distance above the tops of said sidewalls and adapted to be bent to match the outside contour of said header;
   (d) a keyhole passageway through said hanger strap adjacent said sidewalls having a large opening adapted to permit passage of a nail head therethrough and a small opening adapted to permit passage of a nail shank but not a nail head therethrough.
   (e) a plurality of spaced holes through said sidewalls said bottom wall and said hanger strap to permit passage of a nail shank but not of a nail head therethrough, and
   (f) an elongated finger access passageway through each said sidewall adjacent said hanger strap adapted to permit fingers to extend therethrough to hold a nail to be driven through said hanger strap into said header.

2. The joist hanger of claim 1 which additionally includes a passageway through said hanger strap adjacent said keyhole to permit passage of a large bolt or screw therethrough.

3. The joist hanger of claim 1 wherein said overlapped flanges are fastened to each other.

4. The joist hanger of claim 3 wherein said overlapped flanges are welded together.

5. The joist hanger of claim 1 wherein said spaced holes in each said sidewall are in alignment with the respective spaced holes in each other said sidewall, one of each pair of aligned holes being of a size to receive a nail shank therethrough and the other aligned hole being considerably larger in diameter.

6. The joist hanger of claim 2 wherein said additional passageway is square in shape to accommodate the square neck portion of a carriage bolt.

7. A joist hanger for attaching a joist at right angles to a header beam, said joist hanger comprising a cup-shaped seat for receiving the end of a joist and a hanger strap for attaching the joist contained in the cup-shaped seat in abutting relationship to said header beam, said hanger being an integral piece of steel; said cup-shaped seat comprising two sidewalls and a bottom wall extending outward at right angles from said hanger strap with said bottom wall being formed from flanges of said sidewalls bent toward each other and joined together in an overlapping relationship; said hanger strap extending upwardly beyond said sidewalls and being bendable to match the outside contours of said header beam; said sidewalls, said bottom wall, and said hanger strap being pierced with holes to permit nails to be driven therethrough and into the joist or the header beam respectively to attach the hanger thereto; said sidewalls including passageways to permit fingers to extend therein to hold nails to be driven into said header beam, said hanger strap having a keyhole passageway adjacent said sidewalls to permit passage of a nail head through the larger portion of the keyhole.

8. The joist hanger of claim 7 wherein said hanger strap additionally includes a passageway adjacent said keyhole to receive a large diameter bolt or screw therethrough.

9. The joist hanger of claim 8 wherein said additional passageway is square.

10. The joist hanger of claim 7 wherein said holes for nails in said sidewalls are positioned in aligned pairs, one of each pair in each sidewall, one of said pair being of a size to approximate the shank of a nail to be driven therethrough and the other of said pair to be 2-3 times the diameter of said one.

11. A metal joist hanger blank for forming a unitary joist hanger comprising an inverted T-shaped planar member comprising a substantially rectangular base portion having an upper edge, a lower edge and two parallel side edges and an elongated vertical strap portion having two parallel side-edges and a free upper end extending upwardly medially of said upper edge; a generally rectangular cutout portion medially of said lower edge and extending laterally beyond the respective vertical projections of said side edges of said strap portion, and having an upper edge parallel to said lower edge of said base portion; a pair of spaced vertical fold lines aligned with said side edges of said strap portion and extending from said upper edge of said base portion to said cutout portion; a pair of horizontal fold lines aligned with the upper edge of said cutout portion and extending from said cutout portion to said respective side edges of said base portion; and a plurality of spaced holes punched through said strap portion and said base portion of a size to receive the shank of a nail therethrough but not large enough to permit the passage of a nail head therethrough.

12. The blank of claim 11 wherein said base portion between said vertical fold lines and adjacent said upper edge of said base portion includes a keyhole passageway with the smaller portion of said passageway located vertically above the larger portion of said passageway.

13. The blank of claim 11 wherein said base portion between said side edges of the base portion and said vertical fold lines includes an enlarged finger access vertically elongated passageway in each respective part of said base portion, said access passageways terminating vertically above respective said horizontal fold lines and spacedly below said upper edge of said base portion, each said part of said base portion having spaced nail openings adjacent said access passageways, one nail opening being located closely adjacent said cutout portion and between said vertical fold lines.

14. The blank of claim 11 wherein the portions of said blank below said horizontal fold lines contain openings for the passage of nail shanks therethrough, the openings in one said portion being larger than the corresponding openings in the other said portion.

15. The blank of claim 11 wherein said base portion between said vertical fold lines and adjacent said upper edge of said base portion includes a large square passageway to permit passage of the shank of a large bolt or screw therethrough but not the head thereof.

16. A joist hanger for connecting a wooden joist to a wooden header comprising an elongated vertical strap having vertical side edges and extending from its upper free end portion to its lower connected end portion, a pair of spaced side walls integral with and connected to said lower connected end portion along spaced vertical and parallel fold lines extending substantially in alignment with respective said side edges of said strap, said side walls having upper edges extending laterally generally medially of said side edges of said strap, said side walls being located at substantially right angles with respect to said strap, said side walls having lower edges connected by substantially right angled flanges partially overlapping and forming a bottom wall spanning the space between said side walls substantially the width of said strap, at least one spot welding means connecting said flanges together to maintain said side walls substantially parallel, said lower connected end portion of said strap forming the rear wall and together with said side walls and bottom wall forming a stirrup seat member for receiving a wooden joist thereinto, each of said bottom flanges having openings therethrough aligned when said flanges are partially overlapped and affixed by said spot welding means.

17. A joist hanger of claim 16 wherein said opening in the lower flange of said overlapped flanges is smaller than the aligned opening in the upper flange of said overlapped flanges.

18. A joist hanger of claim 16 wherein each said side wall includes an enlarged finger access vertically elongated passageway extending closely adjacent and along said vertical fold line, said vertical strap having a plurality of spaced nail openings along its length, one of said nail openings in said strap being located adjacent said bottom wall with each of said access passageways providing room for fingers to hold a nail while it is driven with a hammer into said header.

19. A joist hanger as defined in claim 16 wherein said lower connected end portion of the strap includes a keyhole passageway with the smaller portion thereof being located vertically above the larger portion thereof and adjacent the upper ends of said vertical fold lines.

20. A joist hanger of claim 16 wherein each of said side walls includes spaced nail shank holes aligned with larger holes on the other of said side walls to permit the nail to pass therethrough and be bent on the outside of said other side wall.

21. A joist hanger of claim 16 wherein said lower connected end portion of the strap includes a square passageway to admit a carriage bolt therethrough and located adjacent the upper ends of said vertical fold lines.

* * * * *